US009594770B1

(12) United States Patent
Kushmerick et al.

(10) Patent No.: US 9,594,770 B1
(45) Date of Patent: Mar. 14, 2017

(54) SCORE-BASED SELECTION OF STORAGE DEVICE FOR VIRTUAL DISK WITH SPECIFICATION OF QUALITY OF SERVICE

(75) Inventors: Nicholas Kushmerick, Seattle, WA (US); Patrick Bozeman, San Mateo, CA (US)

(73) Assignee: EMC IP Holding Company LLC, Hopkinton, MA (US)

(*) Notice: Subject to any disclaimer, the term of this patent is extended or adjusted under 35 U.S.C. 154(b) by 510 days.

(21) Appl. No.: 13/170,816

(22) Filed: Jun. 28, 2011

(51) Int. Cl.
*G06F 17/30* (2006.01)
*G06F 9/455* (2006.01)

(52) U.S. Cl.
CPC .. *G06F 17/30221* (2013.01); *G06F 17/30138* (2013.01); *G06F 17/30233* (2013.01); *G06F 2009/45583* (2013.01)

(58) Field of Classification Search
CPC ......... G06F 17/30221; G06F 17/30233; G06F 17/30138; G06F 2009/45583
USPC ........................................ 707/822, 823, 831
See application file for complete search history.

(56) References Cited

U.S. PATENT DOCUMENTS

2003/0225801 A1* 12/2003 Devarakonda et al. ...... 707/205
2004/0176118 A1* 9/2004 Strittmatter et al. ......... 455/500
2008/0098194 A1* 4/2008 Hashimoto ........... G06F 1/3221
  711/173
2008/0263306 A1* 10/2008 Tanizawa ....................... 711/170
2011/0320606 A1* 12/2011 Madduri et al. ............... 709/226
2012/0185413 A1* 7/2012 Felter ............................ 705/400
2012/0303800 A1* 11/2012 Maldaner .............. G06F 9/5011
  709/224

OTHER PUBLICATIONS

Kochat "On Impact of Dynamic Virtual Machine Reallocation on Data Center Efficiency" Sep. 2008, Modeling, Analysis and Simulation of Computers and Telecommunication System.*

* cited by examiner

*Primary Examiner* — Vincent Boccio
(74) *Attorney, Agent, or Firm* — BainwoodHuang

(57) ABSTRACT

Selecting a storage device to be mapped to a requested virtual disk includes maintaining attributes for a set of storage devices including a cost attribute, a capacity attribute and quality-of-service attributes. A request for a virtual disk includes request parameters including a price parameter, a capacity parameter and quality-of-service parameters. A device selection function generates a score for each storage device based on the request parameters and the storage device attributes, and identifies a best suited storage device by comparing the respective scores of the storage devices. The virtual disk is then created in satisfaction of the request with a mapping to the identified storage device to provide underlying physical data storage for the virtual disk.

27 Claims, 4 Drawing Sheets

SCORE-BASED SELECTION OF STORAGE DEVICE FOR VIRTUAL DISK WITH SPECIFICATION OF QUALITY OF SERVICE

BACKGROUND

The invention is related to the field of data storage systems.

Data storage systems are known that provide so-called "storage as a service" operation in which storage capacity is given to users on a contract basis (e.g., a subscription). The service may be provided over a public network such as the Internet. In this model, users are presented with storage in the form of "virtual disks" that from the users' perspective have all the attributes of real physical storage devices, including for example respective total storage capacities and perhaps certain quality-of-service or QoS parameters. Each virtual disk is mapped to a region of a physical storage device where the underlying real physical storage is provided.

SUMMARY

One task in data storage systems providing storage as a service using virtual disks is the assigning or mapping of a virtual disk to a storage device that provides physical storage for the data of the virtual disk. Viewed generally, this task is an exercise in resource allocation. Given a request for a virtual disk from a user, the system selects from among a set of available storage devices to be used for the virtual disk in satisfaction of the request, in a manner promoting goals such as efficiency and cost minimization.

Method and apparatus are disclosed that are directed to the task of selecting a storage device to be mapped to a requested virtual disk in a data storage system. Generally, the method includes comparing attributes of a set of storage devices with corresponding parameters of a request to generate a set of device scores, each expressing a level of suitability of the respective storage device for the request. The device scores are then compared to identify the best-suited storage device based on its score relative to other storage devices.

More specifically, respective sets of attributes are maintained for a set of storage devices of a data storage system, the set of attributes for each storage device including a cost attribute, a capacity attribute and a set of quality-of-service attributes. The cost attribute expresses a cost of operating the storage device; the capacity attribute expresses a usable or available storage capacity of the storage device; and the quality-of-service attributes express levels of respective aspects of service provided by the storage device in operation such as performance or durability. The attributes may also include a location attribute which identifies a physical location of the storage device.

The data storage system receives a request for creation of a virtual disk to store user data (details of this operation are described below). The request includes a set of request parameters including a price parameter, a capacity parameter and a set of quality-of-service parameters. The price parameter expresses a desired maximum price for using the virtual disk; the capacity parameter expresses a desired capacity of the virtual disk to store user data; and the quality-of-service parameters expresses desired levels of respective aspects of service to be provided by the virtual disk in operation. The request may also include a location parameter specifying a criteria for location.

The system applies a device selection function to the request to select a storage device to be mapped to the virtual disk in satisfaction of the request. The device selection function generates a respective score for each storage device based on the parameters of the request and the attributes of the storage device, and identifies a best suited storage device by comparing the respective scores of the storage devices. The virtual disk is then created in satisfaction of the request with a mapping to the identified storage device to provide underlying physical data storage for the virtual disk.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
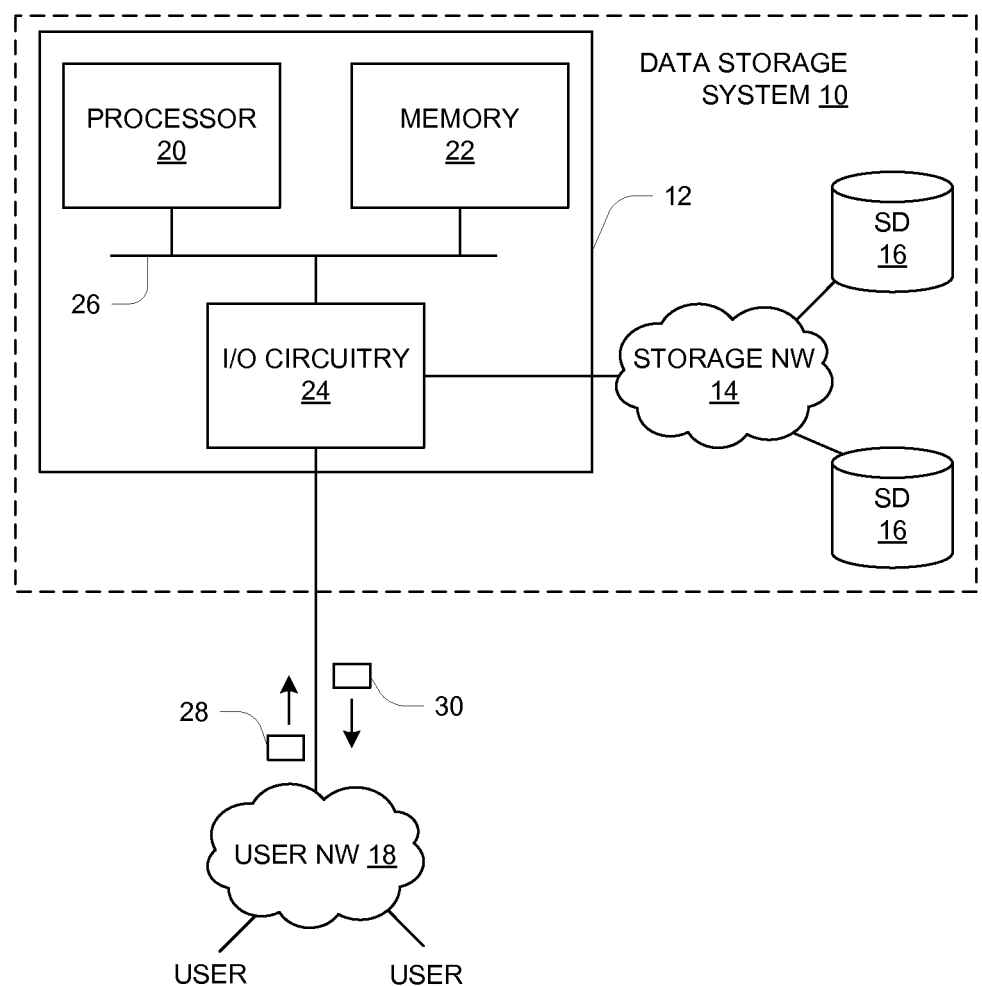
FIG. 1 is a block diagram of a data storage system.

FIG. 1 shows a data storage system 10 as including a computer 12, a storage network 14 and storage devices (SDs) 16. The data storage system 10 has connections through the computer 12 to one or more user networks 18 to which users of the data storage system 10 are connected. The computer 12 is shown as including a processor 20, memory 22 and input-output (I/O) circuitry 24 connected together by interconnect 26 such as a high-speed data bus.

In one embodiment, the data storage system 10 may be configured and operated according to a so-called "storage as a service" model, by which storage capacity is offered to a set of remote users. A storage as a service system may be operated and administered within an organization or association, or it may be provided in a more public manner, such as by subscription from members of the public. In the latter model, the user network 18 may be the public Internet or a similar public or quasi-public network. A user enters into a contract with a storage as a service provider to obtain one or more "virtual disks" representing an agreed amount of data storage capacity available to the user for a specified cost. In many cases, the agreement may also specify certain "quality-of-service" parameters, such as access times and availability ("up-time"). As described more below, the data storage system 10 provides an interface by which the users can access their respective virtual disks, and it stores the user data of the virtual disks on the storage devices 16.

The storage network 14 may be any of a variety of known network types using storage-oriented protocols and operations. In one embodiment it may be a so-called "storage area network" or SAN employing FibreChannel or iSCSI communications protocols for example. In some embodiments, the storage devices 16 may be directly attached to computer(s) 12 of the data storage system 10 via short-length system I/O buses, in which case a storage network 14 may not be utilized. The storage devices 16 are hardware devices containing data storage media of some type. One typical storage device 16 is a disk drive utilizing one or more disks coated with a magnetizable thin film and electronic circuitry for writing and reading patterns of magnetization to/from the magnetizable film. A storage device 16 may employ semiconductor memory as a data storage medium, such as an array of electrically erasable non-volatile memory devices commonly referred to as "flash" memory. Other types of physical storage media may be utilized.

The computer 12 of FIG. 1 is programmed with instructions stored in the memory 22 and executed by the processor 20 to cause the computer 12 to perform storage operations and provide a storage service accessed by the remote users using storage requests and responses. In operation, the computer 12 receives I/O requests 28 (read or write commands directed to user virtual disks) from the users via the user network 18, employs a mapping to identify a storage device 16 (and storage area thereof) where data for a target virtual disk specified in a request is located, performs back-end I/O operations on the storage devices 16 to read and write user data as part of carrying out the user I/O requests 28, and returns I/O responses 30 to the users. More specifically, a received write request 28 results in a back-end operation of writing the data of the write request to a storage device 16 according to the mapping for the target virtual disk, and a received read request 28 results in a back-end operation of reading data from a storage device 16 according to the mapping for the target virtual disk and returning a response 30 including the read data to the requesting user. Additional details of this operation are provided below.

Figure 2:
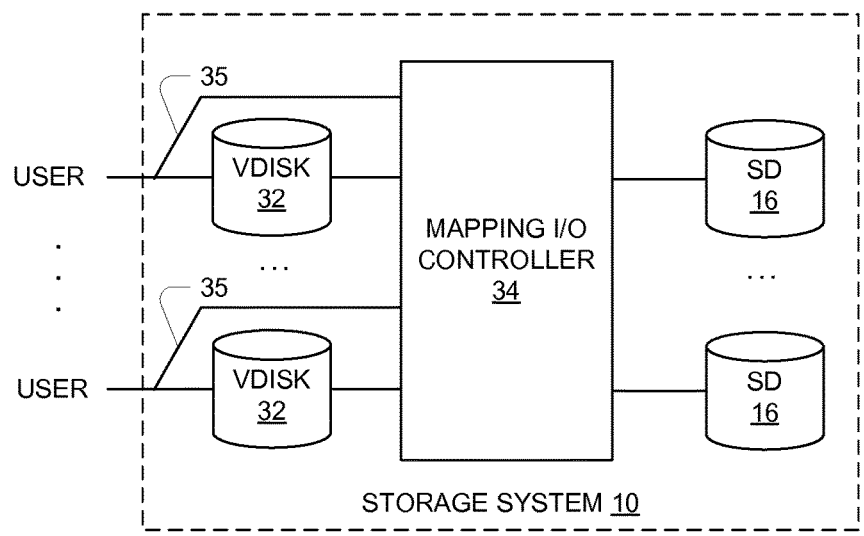
FIG. 2 is a functional block diagram of a computer in a data storage system.

FIG. 2 shows the data storage system 10 from a functional or operational perspective. The instructions executing on the computer 12 define virtual disks (VDISKs) 32 and a mapping I/O controller 34. A virtual disk 32 is a software interface to a unit of storage made available to a user, mapping to underlying physical storage provided by a storage device 16. From a user's perspective, a virtual disk 32 appears as a real storage device. It is the target of storage I/O requests 28, and it has a variety of attributes or parameters of the same type generally possessed by real storage devices. The mapping I/O controller 34 is a set of functions and data implementing storage functionality including functionality described herein.

Also shown in FIG. 2 are separate control channels or interfaces 35 between the users and the mapping I/O controller 34, apart from the virtual disks 32, for the exchange of service-related messaging including requests by the users for creation of virtual disks 32. In one embodiment such an interface 35 may be realized by a user-interface web application of the type often used in online commerce.

Figure 3:
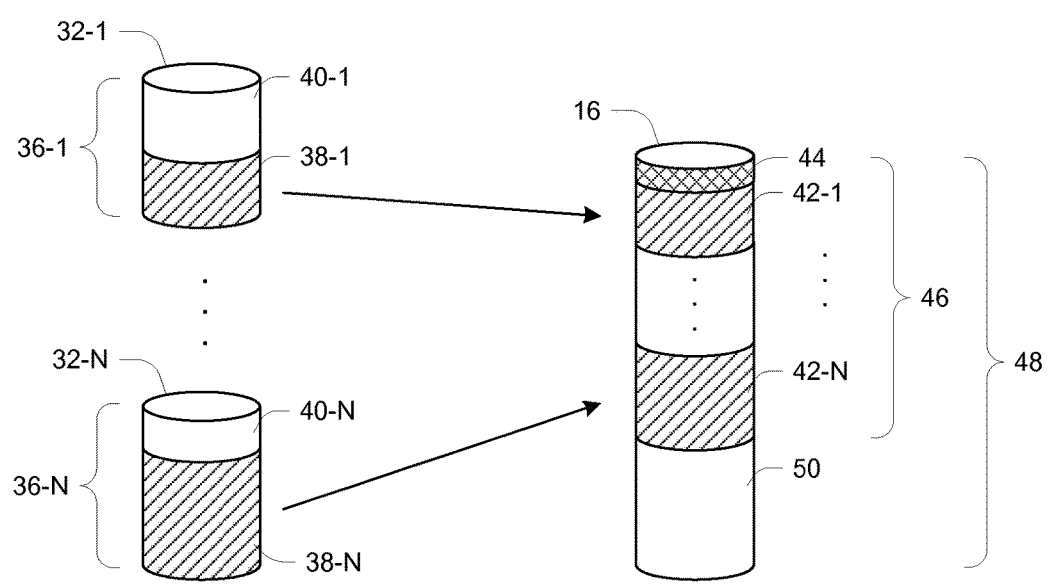
FIG. 3 is a schematic depiction of a mapping of virtual disks to a storage device.

FIG. 3 illustrates an example mapping of virtual disks 32 to a set of one or more devices 16, the mapping being maintained and used by the mapping I/O controller 34 in the processing of storage I/O requests 28 from the users. The virtual disks 32 are shown at left, enumerated as 32-1 through 32-N. Each virtual disk 32 is shown as having a respective capacity 36 (36-1 through 36-N), and at any given time each virtual disk 32 has a respective consumed area 38 which is a portion of the virtual disk 32 actually "storing" user data at that time (i.e., for which there is user data stored on the storage device 16 and accessible via the virtual disk 32). A virtual disk 32 may also have unused area 40. As shown, each consumed area 38 is mapped to a corresponding region 42 of the storage device 16, with the set of all regions 42 and an overhead area 44 constituting a consumed area 46 of the storage device 16. The overhead area 44 stores metadata pertaining to the virtual disks 32 used by the mapping I/O controller 34 in operation. The storage device 16 has an available capacity 48 which is the sum of the size of the consumed area 46 and the size of an unused area 50 available to store user data.

The above-discussed mapping is represented in FIG. 3 by the arrows extending from the virtual disks 32 to the areas 42 of the storage device 16. It will be appreciated that in practice this mapping may be realized in any of a variety of ways, generally using a data structure that creates one or more associations between each of one or more addressed regions of each virtual disk 32 and a corresponding addressed region of the storage device 16. The construction and use of such mapping data structures is generally known in the art. As described herein, the presently disclosed technique can include dynamically changing the mapping of virtual disks 32 to storage devices 16 so as to meet certain operational goals. It should be noted that the areas identified by references 38 and 42 need not be, and generally may not be, single contiguous extents. The depiction in FIG. 3 is used to distinguish storage space that is currently consumed or utilized for user data (areas 38, 40) from storage space that is currently unused for user data (areas 40, 50)—it does not necessarily represent an actual organization of data on a virtual disk 32 or storage device 16.

It should be noted that in general, a storage device 16 may store data of one or multiple virtual disks 32, and a virtual disk 32 may be confined to one storage device 16 or span multiple storage devices 16. Operation does not necessarily require any particular relationship between the size of a given virtual disk and the size of the underlying storage device.

Figure 4:
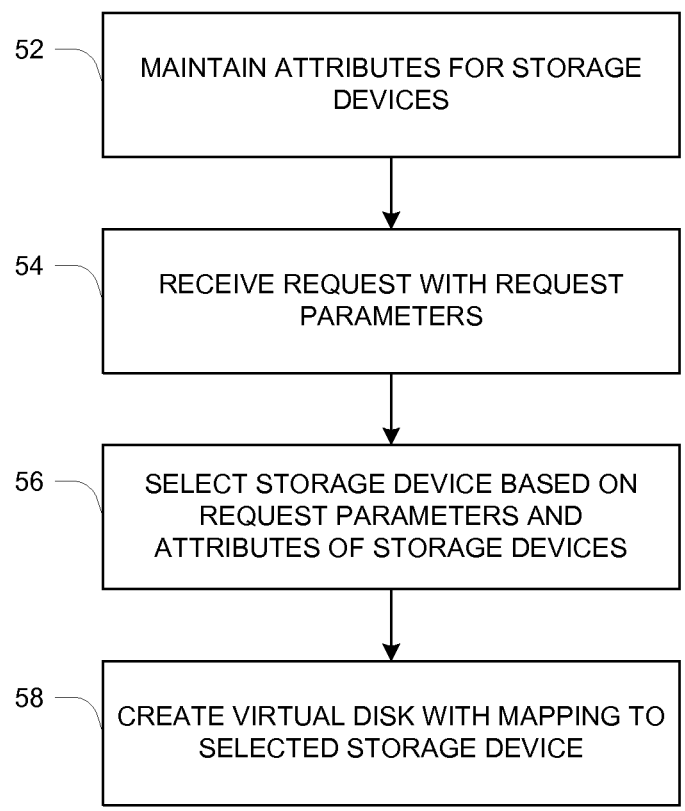
FIG. 4 is a flow diagram of an overall process for identifying a storage device in satisfaction of a request for a virtual disk.

FIG. 4 presents a high-level description of operation by the mapping I/O controller 34 to select a storage device 16 to which a new virtual disk 32 is to be mapped for underlying physical storage. At 52, the mapping I/O controller 34 maintains respective sets of attributes for the storage devices 16, the attributes describing certain characteristics of the storage devices that will be used in the selection process. The set of attributes for each storage device 16 include a cost attribute, a capacity attribute, a location attribute, and a set of quality-of-service (QoS) attributes.

The cost attribute expresses a cost of operating the storage device 16, typically normalized to both time and unit of storage (e.g., dollars per month per gigabyte of device capacity). The cost attribute may include direct factors such as depreciation and energy usage, as well as more indirect factors such as an allocated share of system overhead or similar items.

The capacity attribute expresses a usable or available storage capacity of the storage device 16 in a common unit (e.g. megabytes or gigabytes). Capacity may be expressed and evaluated in different ways as explained below.

The location attribute expresses location, and is used to provide for rules such as "to enable disaster recovery, locate the disk more than 20 km from my existing virtual disks", or "to minimize latency, locate the disk in the same datacenter as my existing virtual disks".

The QoS attributes express levels of different aspects of service that are provided by the storage device 16 in operation. Examples of QoS characteristics include performance (e.g., I/O request latency and/or throughput) and durability (e.g., RAID level, % up time, backup/recovery characteristics).

At 54, the mapping I/O controller 34 receives a request for creation of a virtual disk 32 to store user data. As an example, a customer might fill in and submit a web page (made available to customers of the service) to request a virtual disk with certain capacity, etc. The submission of the web page results in the request being sent to the data storage system. The request includes a set of request parameters including a price parameter, a capacity parameter, a location parameter and a set of QoS parameters. The price parameter expresses a desired maximum price for the use of the requested virtual disk 32, also normalized to time and size as for the cost attribute. The capacity parameter expresses a desired capacity of the virtual disk to store user data in the same common unit (e.g., MB or GB). The QoS parameters express desired levels of aspects of service to be provided by the virtual disk in operation.

Although not essential, it may be useful to employ a regularized and somewhat abstracted scheme for expression of QoS parameters in a request. As an example, a given QoS parameter may be selected from the set of {gold, silver, bronze} corresponding to three ranked levels, gold being highest or best and bronze being lowest or worst. Such a scheme can provide desirable uniformity and simplicity in the expression and use of QoS parameters.

At 56, a device selection function is applied to the request to select a storage device 16 to be used to provide the underlying physical storage for the virtual disk to be created in satisfaction of the request, the selection based on the parameters from the request as well as the attributes of the storage devices 16. Specifically, the device selection function generates a respective score for each storage device 16 based on the parameters of the request and the attributes of the storage device 16, and then identifies a best suited storage device 16 for the request by comparing the respective scores of the storage devices 16. Details of this operation are provided below.

At 58, a virtual disk 32 is created in satisfaction of the request, with a mapping to the storage device 16 selected at 56 to provide the underlying physical data storage. The creation of a virtual disk 32 and mapping to a storage device 16 are generally known in the art and not elaborated further.

Figure 5:
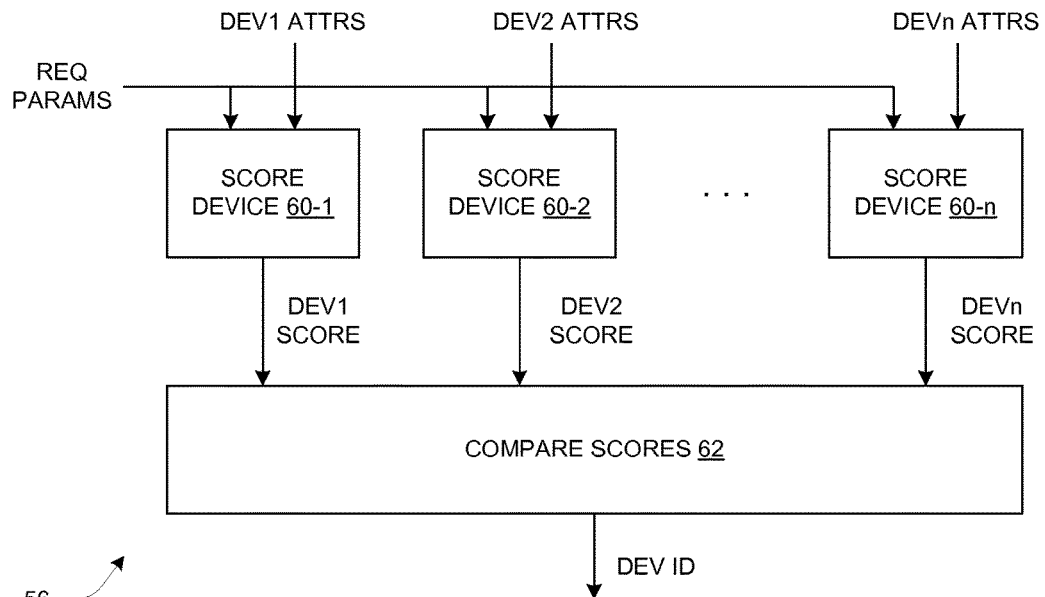
FIG. 5 is a block diagram depicting a device selecting operation of the process of FIG. 4.

FIG. 5 illustrates the selecting of a storage device 16 at step 56 of FIG. 4. For each storage device 16, a respective device scoring operation 60 (shown as SCORE DEVICE 60-1, 60-2, . . . 60-n for storage devices 1 to n) generates a respective device score (DEV1 SCORE, DEV2 SCORE, . . . , DEVn SCORE). Each device scoring operation 60 generates its output device score based on the request parameters (REQ PARAMS) and the attributes for the respective storage device 16 (DEV1 ATTRs, DEV2 ATTRs, . . . , DEVn ATTRs). As explained below, each device score is an aggregated score including components for several parameter/attribute pairs. A score comparing function 62 (COMPARE SCORES) uses the device scores to identify a high-scoring storage device 16 as the best suited storage device to be used in satisfaction of the request, this identification being shown as a device identifier (DEV ID) generated by the score comparing function 62. In one example, DEV ID may be a unique value in a device numbering scheme in which each storage device 16 is identified by a corresponding unique number. Examples of score comparing functions 62 are provided below.

Figure 6:
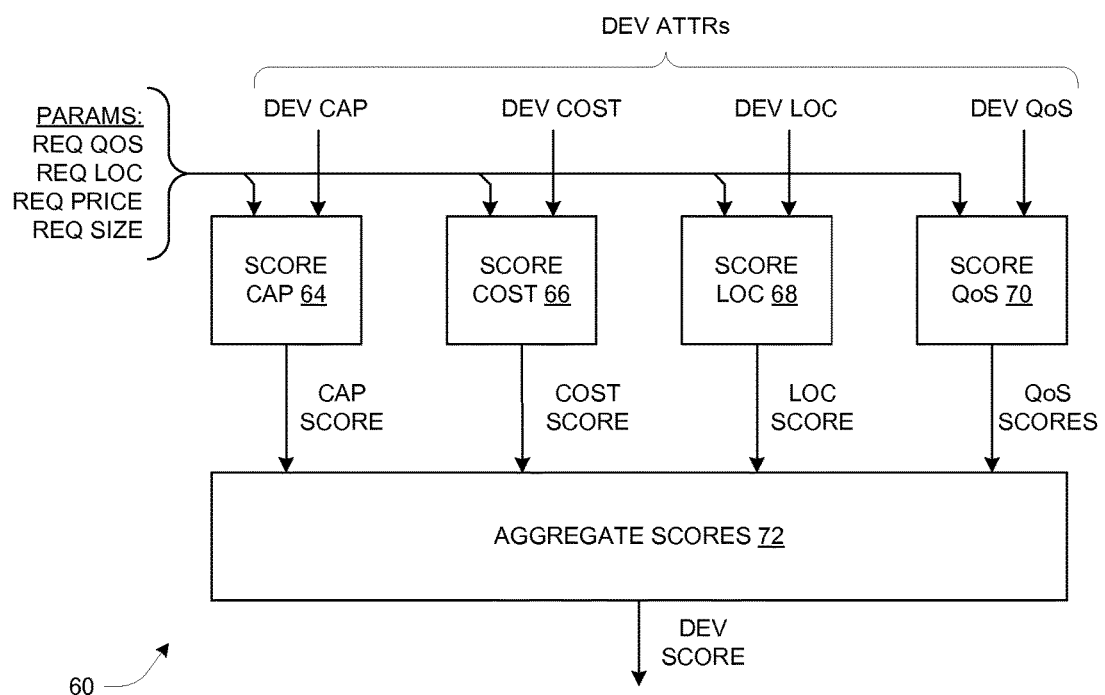
FIG. 6 is a block diagram depicting a device scoring operation in the device selecting operation of FIG. 5.

FIG. 6 illustrates the device scoring operation 60. A set of attribute scoring operations 64, 66, 68 and 70 are performed using a respective parameter of the request (PARAMS at left) and a respective attribute of the storage device 16 (DEV ATTRs at top) to generate a respective attribute score. A capacity scoring function 64, for example, uses a REQ SIZE parameter from the request parameters and a DEV CAP attribute from the device attributes. The attributes are shown as capacity (DEV CAP), cost (DEV COST), location (DEV LOC) and QoS (DEV QoS). The attribute scoring operations include capacity scoring (SCORE CAP) 64, cost scoring (SCORE COST) 66, location scoring (SCORE LOC) 68, and QoS scoring (SCORE QoS) 70, generating respective attribute scores shown as CAP SCORE, COST SCORE, LOC SCORE and QoS SCORES. Note that there may be multiple QoS dimensions and corresponding scores, as explained in some detail below. The attribute scores are aggregated in a score aggregating operation 72 to produce an overall score (DEV SCORE) for the storage device 16, which indicates a level of suitability of the storage device 16 to satisfy the request.

Below are provided several examples of functions or operations shown in FIGS. 5 and 6, expressed as the evaluating of certain expressions which include the request parameters and the device attributes. In the description below, request parameters shown as PARAMS in FIGS. 5 and 5 are identified by a prefix "request.", while storage device attributes shown as DEV ATTRs in FIGS. 5 and 5 are identified by a prefix "device.".

As indicated above, a request has several parameters:
request=(price, size, qos_performance, qos_durability, qos_xyz, . . . )
where:
request.price is the price the customer will pay for the virtual disk 32 (per amount of storage per unit of time—e.g., $1 per GB per month);
request.size is the size of the requested virtual disk (e.g., 100 GB);
request.qos_performance is a minimum performance QoS required (e.g., gold);
request.qos_durability is a minimum durability QoS required (e.g., silver);
request.qos_xyz represents minimum QoS required for other dimension(s) "xyz".

The storage devices 16 are identified as follows:
devices=[device1, device2, . . . ]
Each storage device 16 has several attributes as follows:
device=(capacity, consumed, location, cost, qos_performance, qos_durability, qos_xyz, . . . )
where:
device.capacity is the total size of the device (e.g., 2 TB);
device.consumed is the amount of the capacity that is already allocated to other virtual disks 32 or to overhead of the storage virtualization system (e.g., 500 GB);
device.location is the location of the storage device (e.g., Las Vegas);
device.cost is the total cost (operating expense plus capital expense) of operating the storage device (e.g., $5 per month);
device.qos_performance is a performance QoS guaranteed by the device (e.g., silver);
device.qos_durability is a durability QoS guaranteed by the device (e.g., bronze);
device.qos_xyz is a QoS guaranteed for dimension xyz by the device (e.g., platinum).

Note that the above values device.capacity and device.consumed are together represented by DEV CAP in FIG. 6.

The following are useful assumptions:
1. Size, capacity, consumed: any consistent units (GB, TB, . . . ) as mentioned above.
2. Location: any representation of a point in space; in some cases (e.g., rack within datacenter, one datacenter among several datacenters) only identity is meaningful; in others (e.g., geo-separation between data centers), the representation is assumed to be sufficient to calculate actual Cartesian distance 3. Cost: total cost per byte per month (for expenses such as power, cooling, bandwidth, labor, etc.) in any consistent currency 4. Quality of service (QoS): any number of factors (performance, durability, xyz, . . . ); all are normalized to an interval scale (e.g., bronze, silver, gold, platinum [0-1])

It is desired to efficiently satisfy a customer's request, where efficiency refers to optimizing the system operator's total costs. This can be formalized by restating the goal to be that of assigning the request to the "best" storage device 16:

assignment(request)=best$_i$ score(request,device)

where assignment(request) is the value DEV ID (FIG. 5) identifying the storage device 16 to which the requested virtual disk 32 is to be mapped; score(request, device) is the numerical score DEVi SCORE (FIG. 5) of how well suited device$_i$ is to be assigned for the given request; and best is a function that identifies the most suitable value in a set of arguments provided to the function. As an example, best may be realized using the argmax function, which returns an identification (e.g., value of i) of the highest-valued argument. Referring to FIGS. 5 and 6, in this formulation the per-device scoring is performed at the set of device scoring operations 60 and argmax is evaluated at 62.

In one scheme, scores are non-negative numbers, and larger values are assumed to represent better suitability for assignment.

As described above with reference to step 72 of FIG. 6, the score of a storage device 16 for a request is the result of combining or aggregating a number of attribute scores:

score(request, device)=
combine_scores(
score_capacity(request.size, device.capacity, device.consumed),
score_location(device.location),
score_cost(request.payment, device.cost),
score_qos(request.qos_performance, device.qos_performance),
score_qos(request.qos_durability, device.qos_durability),
score_qos(request.qos_xyz, device.qos_xyz),)
. . .
)

The individual attribute scores above can be calculated as follows.

1. score_capacity(size, capacity, consumed) measures how well the device can accommodate the request in terms of free space. Two of many possible definitions are:
maximize relative free space:
score_capacity(size, capacity, consumed)=max 0, (capacity-consumed-size)/capacity
maximize absolute free space:
score_capacity(size, capacity, consumed)=max 0, capacity-consumed-size 2. score_location(location) measures how suitable the device's location is for the request. Let rlocation be the location of a customer's existing virtual disk 32. Four of many possible definitions are as follows:
minimize latency—Cartesian distance:
score_location(rlocation, dlocation)=‖rlocation·dlocation‖
minimize latency—thresholded Cartesian distance:
score_location(rlocation, dlocation)=‖rlocation·dlocation‖>threshold? 0:1
minimize latency—binary geo-separation:

score_location(rlocation, dlocation)=rlocation=dlocation ? 1:0
maximize geo-separation:
score_location(rlocation, dlocation)=inverse of any of the above Two of the above definitions use the so-called "ternary" operator of the form condition? output if true: output if false which evaluates (condition) and returns one of two values depending on whether the condition is satisfied or not.

Note that the above equations can be modified readily to accommodate situations in which the customer does not yet have any virtual disks or has more than one virtual disk.

3. score_cost(payment, cost) measures the profitability of assigning the request to a device. Three possible definitions:
absolute margin
score_cost(payment, cost)=payment-cost
relative margin
score_cost(payment, cost)=(payment-cost)/cost
thresholded margin
score_cost(payment, cost)=(payment-cost)/cost>threshold? 0:1

4. score_qos(rqos, dqos) measures the extent to which the device satisfies the given QoS dimension. Three possible definitions, depending on whether QoS is measured on an ordinal or interval scale, are as follows:
simple satisfaction (ordinal scale)
score_qos(rqos, dqos)=rqos<dqos? 0:1
simple satisfaction (interval scale)
score_qos(rqos, dqos)=max 0, dqos-rqos
minimal satisfaction (interval scale)
score_qos(rqos, dqos)=max 0, 1/(dqos-rqos)
(minimal satisfaction disfavors devices that provide higher QoS than requested)

The function combine_scores(score1, score2, . . . ), which is a realization of the score aggregating function 72, combines all the attribute scores into a single score. Here are several possibilities:
simple conjunction:
combine_scores(score1, score2, . . . )=$\Pi_i$ score$_i$
soft conjunction:
combine_scores(score1, score2, . . . )=$\Pi_i$ ($\epsilon$+score$_i$)
($\epsilon$ is a small value to avoid a zero result caused by one zero score)
weighted average:
combine_scores(score1, score2, . . . )=$\Sigma_i$ weight$_i$·score$_i$
thresholded weighted average:
combine_scores(score1, score2, . . . )=$\Sigma_i$ weight$_i$·score$_i$'
where score$_i$'=(score$_i$>threshold) ? score$_i$: 0, and threshold$_i$ is a tunable constant.

While various embodiments of the invention have been particularly shown and described, it will be understood by those skilled in the art that various changes in form and details may be made therein without departing from the spirit and scope of the invention as defined by the appended claims.

What is claimed is:
1. A method of operating a data storage system, comprising:
maintaining respective sets of attributes for a set of storage devices of the storage system, the set of attributes for each storage device including a cost attribute, a capacity attribute and a set of quality-of-service attributes, the cost attribute expressing a cost of operating the storage device, the capacity attribute expressing a storage capacity of the storage device, and the quality-of-service attributes expressing levels of respective aspects of service provided by the storage device in operation;

receiving a request from a user to obtain a user-specific virtual disk to store user data, the request including a set of request parameters including a price parameter, a capacity parameter and a set of quality-of-service parameters, the price parameter expressing a maximum price the user will pay for using the virtual disk, the capacity parameter expressing a minimum storage capacity the user requires for the virtual disk to store user data, and the quality-of-service parameters expressing levels of respective aspects of service the user requires to be provided by the virtual disk in operation;

automatically applying a device selection function to the request to select a storage device to be mapped to the virtual disk in satisfaction of the request, the device selection function generating a respective score for each storage device based on the parameters of the request and the attributes of the storage device, the device selection function identifying a best suited storage device by comparing the respective scores of the storage devices;

automatically creating the virtual disk in satisfaction of the request with a mapping to the best suited storage device to provide underlying physical data storage therefor; and providing an interface by which the user accesses the virtual disk for storing the user data thereon and retrieving the user data therefrom.

2. A method according to claim 1, wherein the device selection function includes a set of attribute scoring functions for each storage device, a score aggregating function for each storage device, and a score comparing function, each attribute scoring function for each storage device using a respective parameter of the request and a respective attribute of the storage device to generate a respective attribute score for the storage device, the score aggregating function for each storage device using the attribute scores of the storage device to generate an aggregate score indicating a level of suitability of the storage device to satisfy the request, and the score comparing function using the aggregate scores of the storage devices to identify a high-scoring storage device as the best suited storage device.

3. A method according to claim 2, wherein the attributes for each storage device further include a location attribute, and the request parameters further include a location parameter specifying a location-related criteria for selection of a storage device, and wherein the attribute scoring functions for each storage device include a location scoring function generating a location score expressing suitability of the storage device location for the request.

4. A method according to claim 3, wherein the location scoring function evaluates a rule selected from a first rule for minimizing latency and a second rule for imposing geographic separation.

5. A method according to claim 1, wherein the quality-of-service parameters include a performance level parameter and a durability parameter.

6. A method according to claim 1, wherein the quality-of-service parameters are expressed as levels in a generalized rating scheme not specific to any specific parameter type, and wherein maintaining the sets of attributes includes mapping raw device attributes into corresponding ratings according to the rating scheme, the ratings being used by the attribute scoring to generate the attribute scores.

7. A method according to claim 1, wherein the capacity attribute includes a total capacity of the device and a consumed capacity already storing user data.

8. A method according to claim 1, wherein a quality of service scoring function reduces a quality of service score when a corresponding quality of service attribute indicates that the storage device provides a level of service higher than a requested level of service.

9. A method according to claim 1, wherein the virtual disk appears to a user of the storage system as a real storage device including serving as a target of a storage I/O request and having one or more addressed regions mapped to corresponding addressed regions of the best suited storage device.

10. A method according to claim 1, wherein receiving the request includes receiving a request form submitted by a user and including the request parameters as user-filled values.

11. A method according to claim 1, wherein the storage system includes an external connection to the user and first and second interfaces to the external connection, the first interface including the virtual disk and being used for exchanging the user data between the user and the storage system, the second interface used for exchanging service-related messages including the request between the user and the storage system.

12. A method according to claim 1, wherein the mapping is an initial mapping, and further including automatically and dynamically changing the mapping between the virtual disk and the best suited storage device to meet operational goals during subsequent operation of the data storage system.

13. A method according to claim 1, wherein the virtual disk is a first virtual disk and the mapping is a first mapping of the first virtual disk to a first portion of the best suited storage device, and wherein the steps of claim 1 are repeated in a subsequent process of creating a second virtual disk in response to a second request, the subsequent process resulting in a second mapping of the second virtual disk to a separate remainder portion of the best suited storage device.

14. A method according to claim 1, wherein the best suited storage device is a first best-suited storage device providing a first portion of the underlying physical data storage for the virtual disk, and the mapping is a first mapping of a first portion of the virtual disk to the first best-suited storage device, and wherein (1) the applying step is repeated to identify a second best-suited storage device to provide a second portion of the underlying physical data storage for the virtual disk, and (2) the virtual disk is created with the first mapping for the first portion of the virtual disk and a second mapping of a second portion of the virtual disk to the second best-suited storage device.

15. A computer for use in a data storage system, comprising:
a processor;
memory;
input/output circuitry connecting the computer via a user network to a user; and
interconnect circuitry coupling the processor, memory and input/output circuitry together,
wherein the memory contains a set of computer instructions executable by the processor to:
maintain respective sets of attributes for a set of storage devices of the data storage system, the set of attributes for each storage device including a cost attribute, a capacity attribute and a set of quality-of-service attributes, the cost attribute expressing a cost of operating the storage device, the capacity attribute expressing a storage capacity of the storage device, and the quality-of-service attributes expressing levels of respective aspects of service provided by the storage device in operation;

receive a request from the user via the user network to obtain a user-specific virtual disk to store user data, the request including a set of request parameters including a price parameter, a capacity parameter and a set of quality-of-service parameters, the price parameter expressing a maximum price the user will pay for using the virtual disk, the capacity parameter expressing a minimum storage capacity the user requires for the virtual disk to store user data, and the quality-of-service parameters expressing desired levels of respective aspects of service the user requires to be provided by the virtual disk in operation;

automatically apply a device selection function to the request to select a storage device to be mapped to the virtual disk in satisfaction of the request, the device selection function generating a respective score for each storage device based on the parameters of the request and the attributes of the storage device, the device selection function identifying a best suited storage device by comparing the respective scores of the storage devices;

automatically create the virtual disk in satisfaction of the request with a mapping to the best suited storage device to provide underlying physical data storage therefor; and provide an interface to the user network by which the user accesses the virtual disk for storing the user data thereon and retrieving the user data therefrom.

16. A computer according to claim 15, wherein the device selection function includes a set of attribute scoring functions for each storage device, a score aggregating function for each storage device, and a score comparing function, each attribute scoring function for each storage device using a respective parameter of the request and a respective attribute of the storage device to generate a respective attribute score for the storage device, the score aggregating function for each storage device using the attribute scores of the storage device to generate an aggregate score indicating a level of suitability of the storage device to satisfy the request, and the score-comparing function using the aggregate scores of the storage devices to identify a high-scoring storage device as the best suited storage device.

17. A computer according to claim 16, wherein the attributes for each storage device further include a location attribute, and the request parameters further include a location parameter specifying a location-related criteria for selection of a storage device, and wherein the attribute scoring functions for each storage device include a location scoring function generating a location score expressing suitability of the storage device location for the request.

18. A computer according to claim 17, wherein the location scoring function evaluates a rule selected from a first rule for minimizing latency and a second rule for imposing geographic separation.

19. A computer according to claim 15, wherein the quality-of-service parameters include a performance level parameter and a durability parameter.

20. A computer according to claim 15, wherein the quality-of-service parameters are expressed as levels in a generalized rating scheme not specific to any specific parameter type, and wherein maintaining the sets of attributes includes mapping raw device attributes into corresponding ratings according to the rating scheme, the ratings being used by the attribute scoring to generate the attribute scores.

21. A computer according to claim 15, wherein the capacity attribute includes a total capacity of the device and a consumed capacity already storing user data.

22. A computer according to claim 15, wherein a quality of service scoring function reduces a quality of service score when a corresponding quality of service attribute indicates that the storage device provides a level of service higher than a requested level of service.

23. A computer according to claim 15, wherein the storage system includes an external connection to the user network and first and second interfaces to the external connection, the first interface including the virtual disk and being used for exchanging the user data between the user and the storage system, the second interface used for exchanging service-related messages including the request between the user and the storage system.

24. A non-transitory computer-readable medium having a set of computer instructions stored thereon, the computer instructions being executable by a computer of a data storage system to cause the computer to:

maintain respective sets of attributes for a set of storage devices of the storage system, the set of attributes for each storage device including a cost attribute, a capacity attribute and a set of quality-of-service attributes, the cost attribute expressing a cost of operating the storage device, the capacity attribute expressing a storage capacity of the storage device, and the quality-of-service attributes expressing levels of respective aspects of service provided by the storage device in operation;

receive a request from a user to obtain a user-specific virtual disk to store user data, the request including a set of request parameters including a price parameter, a capacity parameter and a set of quality-of-service parameters, the price parameter expressing a maximum price the user will pay for using the virtual disk, the capacity parameter expressing a minimum storage capacity the user requires for the virtual disk to store user data, and the quality-of-service parameters expressing levels of respective aspects of service the user requires to be provided by the virtual disk in operation;

automatically apply a device selection function to the request to select a storage device to be mapped to the virtual disk in satisfaction of the request, the device selection function generating a respective score for each storage device based on the parameters of the request and the attributes of the storage device, the device selection function identifying a best suited storage device by comparing the respective scores of the storage devices;

automatically create the virtual disk in satisfaction of the request with a mapping to the best suited storage device to provide underlying physical data storage therefor; and provide an interface by which the user accesses the virtual disk for storing the user data thereon and retrieving the user data therefrom.

25. A non-transitory computer-readable medium according to claim 24, wherein the device selection function includes a set of attribute scoring functions for each storage device, a score aggregating function for each storage device, and a score comparing function, each attribute scoring function for each storage device using a respective parameter of the request and a respective attribute of the storage device to generate a respective attribute score for the storage device, the score aggregating function for each storage device using the attribute scores of the storage device to generate an aggregate score indicating a level of suitability of the storage device to satisfy the request, and the score comparing function using the aggregate scores of the storage devices to identify a high-scoring storage device as the best suited storage device.

26. A non-transitory computer-readable medium according to claim 25, wherein the attributes for each storage device further include a location attribute, and the request parameters further include a location parameter specifying a location-related criteria for selection of a storage device, and wherein the attribute scoring functions for each storage device include a location scoring function generating a location score expressing suitability of the storage device location for the request.

27. A non-transitory computer-readable medium according to claim 25, wherein the location scoring function evaluates a rule selected from a first rule for minimizing latency and a second rule for imposing geographic separation.

* * * * *